(No Model.)

F. A. SMITH, Jr.
STAPLE OR FASTENER.

No. 292,516. Patented Jan. 29, 1884.

Witnesses.
Fred E. Field.
Hugh C Donnelly

Inventor.
Franklin A. Smith Jr.
by Crosby & Gregory Att's.

UNITED STATES PATENT OFFICE.

FRANKLIN A. SMITH, JR., OF PROVIDENCE, RHODE ISLAND.

STAPLE OR FASTENER.

SPECIFICATION forming part of Letters Patent No. 292,516, dated January 29, 1884.

Application filed November 21, 1883. (No model.)

*To all whom it may concern:*

Be it known that I, FRANKLIN A. SMITH, Jr., a citizen of the United States, and residing in the city and county of Providence, and State of Rhode Island, have invented an Improvement in Staples or Fasteners, of which the following description, in connection with the accompanying drawings, is a specification, like letters on the drawings representing like parts.

My invention relates to a cut staple or fastener for carpets, buttons, and other uses, the prongs of the same, together with the head, being punched or stamped into ultimate form from sheet metal, thus avoiding the usual bending for the formation of the prongs, as in the production of ordinary wire staples, whereby the form or configuration of the staple or fastener after it has been punched or stamped from sheet metal is not bent, to thus impair the original strength of the metal.

To this end my invention consists of a staple or fastener consisting, essentially, of an integral base and two or more prongs projecting from one edge thereof, the whole punched or stamped from sheet metal, with the metal in said staple or fastener of the same strength and in the same condition as that in which it existed in the sheet, substantially as hereinafter more fully described, and particularly pointed out in the claims.

Figure 1:
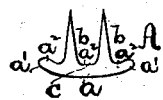
Figure 2:
Figure 3:
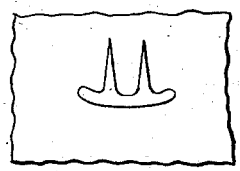

Figure 1 is an elevation of my improved staple or fastener as stamped from sheet metal. Fig. 2 is an end view of Fig. 1, and Fig. 3 is a plan showing a piece of sheet metal from which a staple or fastener such as shown in Fig. 1 has been cut.

The staple or fastener A consists, essentially, of a base, $a$, and prongs $b$, integral therewith, and projecting from one edge, $c$, the whole being stamped or punched from sheet metal, ready for use as a staple or fastener without further manipulation, and without bending the metal therein, or otherwise changing its configuration or affecting or changing the metal of said staple from the condition and strength in which it existed in the sheet. The staple or fastener has the ends of its base $a$ projecting laterally beyond the prongs $b$, so as to form broad abutting and holding shoulders $a'$, and to provide three bearing-surfaces, $a^2$, to more thoroughly adapt it for use as a strong, firm fastening or securing device.

The prongs $b$ may be of uniform thickness from heel to point; or they may be made tapering, or be otherwise changed in form, so that the staple or fastener retains the essential feature of my invention.

I do not claim as any part of my invention a tack, staple, or fastener in which the metal composing the same is changed, affected, or impaired from the condition or strength in which it originally existed in the sheet.

What I claim is—

1. An improved sheet-metal staple or fastener consisting, essentially, of a base and two or more prongs integral therewith, and projecting from the base in substantially the same direction from the edge and in the plane of the said base, both of the said prongs being adapted to enter the material while they are in the plane of the said base, and to be subsequently bent or clinched, the metal composing said staple or fastener being of the strength and condition in which it existed in the sheet from which it was cut, and being without bends, all substantially as and for the purpose set forth.

2. The herein-described improved metallic staple or fastener, consisting of the base $a$, with two prongs, $b$, integral therewith, projecting from one edge thereof at points between the center and ends of the said base, to thereby provide the shoulders $a'$ and afford three bearing-surfaces, $a^2$, the metal composing said staple or fastener being of the same strength and condition in which it existed in the sheet from which it was cut, all as shown, and for the purpose set forth.

In testimony whereof I have signed my name to this specification in the presence of two subscribing witnesses.

FRANKLIN A. SMITH, JR.

Witnesses:
GEO. W. PRENTICE,
CHARLES GREENE.